US007689981B1

(12) United States Patent
Gustafson

(10) Patent No.: US 7,689,981 B1
(45) Date of Patent: Mar. 30, 2010

(54) MOBILE HANDSET WITH EFFICIENT INTERRUPTION POINT DETECTION DURING A MULTIPLE-PASS UPDATE PROCESS

(75) Inventor: James P. Gustafson, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1052 days.

(21) Appl. No.: 10/790,340

(22) Filed: Mar. 1, 2004

Related U.S. Application Data

(60) Provisional application No. 60/450,908, filed on Feb. 28, 2003.

(51) Int. Cl.
G06F 9/44 (2006.01)
G06F 12/06 (2006.01)
G06F 11/00 (2006.01)

(52) U.S. Cl. .................. 717/168; 714/5; 714/6; 711/5; 711/6

(58) Field of Classification Search ............. None
See application file for complete search history.

(56) References Cited

U.S. PATENT DOCUMENTS

| 5,261,055 | A | 11/1993 | Moran et al. ............... 395/275 |
| 5,442,771 | A | 8/1995 | Filepp et al. ............... 395/650 |
| 5,479,637 | A | 12/1995 | Lisimaque et al. .......... 395/430 |
| 5,579,522 | A | 11/1996 | Christeson et al. .......... 395/652 |
| 5,596,738 | A | 1/1997 | Pope ........................ 395/430 |
| 5,598,534 | A | 1/1997 | Haas .................... 395/200.09 |
| 5,608,910 | A | 3/1997 | Shimakura ................. 395/670 |
| 5,623,604 | A | 4/1997 | Russell et al. ............ 395/200.1 |
| 5,666,293 | A | 9/1997 | Metz et al. .............. 395/200.5 |
| 5,752,039 | A | 5/1998 | Tanimura .................... 395/712 |
| 5,778,440 | A | 7/1998 | Yiu et al. .................... 711/154 |
| 5,790,974 | A | 8/1998 | Tognazzini ................. 701/204 |
| 5,878,256 | A | 3/1999 | Bealkowski et al. ........ 395/652 |
| 5,960,445 | A | 9/1999 | Tamori et al. ............... 707/203 |
| 6,009,497 | A | 12/1999 | Wells et al. ................. 711/103 |
| 6,038,636 | A | 3/2000 | Brown, III et al. ......... 711/103 |
| 6,064,814 | A | * 5/2000 | Capriles et al. ............. 717/116 |
| 6,073,206 | A | 6/2000 | Piwonka et al. ............ 711/102 |
| 6,073,214 | A | 6/2000 | Fawcett ..................... 711/133 |
| 6,088,759 | A | 7/2000 | Hasbun et al. ............. 711/103 |
| 6,105,063 | A | 8/2000 | Hayes, Jr. .................. 709/223 |
| 6,112,024 | A | 8/2000 | Almond et al. ............. 395/703 |
| 6,112,197 | A | 8/2000 | Chatterjee et al. ............. 707/3 |
| 6,126,327 | A | 10/2000 | Bi et al. ................. 395/200.51 |
| 6,128,695 | A | 10/2000 | Estakhri et al. ............ 711/103 |

(Continued)

FOREIGN PATENT DOCUMENTS

CA 2339923 3/2000

(Continued)

Primary Examiner—Tuan Q Dam
Assistant Examiner—Zheng Wei

(57) ABSTRACT

A mobile handset with a fault tolerant update agent employs an efficient interruption point detection technique to recover from interruptions during the update of firmware or software. In one embodiment, the update agent updates firmware and/or software employing a plurality of transforms, each transform employing one pass or a subset of one pass to execute, each pass associated with its own bank order and with its own decision maker bank (for recovery following a fault, such as power failure). The devices and method disclosed are applicable to other electronic devices such as, for example, personal digital assistants (PDAs), personal computers (PCs), pagers, and the like.

24 Claims, 2 Drawing Sheets

U.S. PATENT DOCUMENTS

| | | | | |
|---|---|---|---|---|
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,212,557 | B1 * | 4/2001 | Oran | 709/221 |
| 6,223,301 | B1 * | 4/2001 | Santeler et al. | 714/6 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,687,901 | B1 * | 2/2004 | Imamatsu | 717/173 |
| 6,832,373 | B2 * | 12/2004 | O'Neill | 717/171 |
| 6,925,467 | B2 * | 8/2005 | Gu et al. | 707/101 |
| 6,986,133 | B2 * | 1/2006 | O'Brien et al. | 717/173 |
| 7,058,849 | B2 * | 6/2006 | Erstad | 714/5 |
| 7,082,549 | B2 * | 7/2006 | Rao et al. | 714/6 |
| 7,107,329 | B1 * | 9/2006 | Schroder et al. | 709/221 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2004/0040020 | A1 * | 2/2004 | Yang | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

\* cited by examiner

MOBILE HANDSET WITH EFFICIENT INTERRUPTION POINT DETECTION DURING A MULTIPLE-PASS UPDATE PROCESS

CROSS-REFERENCE TO RELATED APPLICATIONS

The present application claims the benefit of U.S. Provisional Patent Application having Ser. No. 60/450,908, filed on Feb. 28, 2003, and hereby incorporates herein by reference the complete subject matter thereof, in its entirety.

The present application also hereby incorporates herein by reference the complete subject matter of PCT application having publication number WO/02/41147 A1, and having application number PCT/US01/44034, filed on Nov. 19, 2001, and U.S. Provisional Patent Application Ser. No. 60/249,606 filed Nov. 17, 2000.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with updating software/firmware in a mobile handset where there is very little free space available in memory to conduct update-related operations. There is need to determine where an update was interrupted in order to resume update activities following an interruption, such as a power failure. It is often difficult to determine where an update was interrupted. Additionally, if an update takes multiple passes, it is not easy to determine which pass to resume update from during a subsequent recovery from failure.

Typically, status information is saved in order to provide information that may be used to recover from activities that are interrupted. However, in FLASH-based electronic device, writing to FLASH requires the steps of erasing the FLASH and writing a whole block of FLASH memory at a time—individual bits of FLASH memory cannot be written. Thus, saving status information for subsequent possible access is an expensive task in terms of the time taken to frequently update status information in FLASH memory.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a mobile handset comprising at least one of a firmware component and a software component. Such an embodiment may comprise an update agent capable of updating the at least one of a firmware component and a software component employing an update process that comprises a plurality of transform passes, and the update agent may execute at least one of the plurality of transform passes in a fault-tolerant mode. In another embodiment of the present invention, the update agent may execute each of the plurality of transform passes in a fault-tolerant mode. The update process may comprise a pre-processing pass and an update pass.

In an embodiment of the present invention, the update agent may be capable of determining a point of interruption of the update process, so as to restart the update process from the point of interruption on a subsequent invocation of the update process. The update agent may be capable of efficiently determining whether a previous invocation of the update process was interrupted during a pre-processing pass or during an update pass, and the update agent may be capable of efficiently determining which of the plurality of transform passes was interrupted during a previous execution of the update process.

An embodiment in accordance with the present invention may comprise a plurality of memory banks, and a set of special signatures comprising at least one special signature corresponding to each of the plurality of transform passes. The at least one special signature may be associated with the last of the memory banks that is updated in the corresponding transform pass, and at least a subset of the plurality of memory banks may be modified in each of the plurality of transform passes. In addition, the update agent may be capable of determining which of the plurality of transform passes was interrupted during a previous execution of the update process. The update agent may determine the transform pass that was interrupted during a previous execution of an update process, and the specific one of the plurality of memory banks that was last to be successfully updated, in order to resume the update process. The update agent in an embodiment of the present invention may compare, in a transform pass order, each special signature from the set of special signatures to a signature computed for the last bank to be updated in the corresponding transform pass, until a mismatch is detected, the mismatch indicating a point of interruption during a previous update attempt. The special signature may comprise one of a cyclic redundancy check (CRC) value and an MD5 hash value.

Further aspects of the present invention may be observed in a mobile handset comprising a plurality of memory banks containing at least one of a firmware and a plurality of software components. In an embodiment in accordance with the present invention, the mobile handset may comprise an update package comprising a difference information, and an update agent capable of updating at least a portion of the at least one of firmware and a plurality of software components. The update agent may employ an update process that comprises a plurality of transform passes, and each transform pass may update a subset of the plurality of memory banks in a predetermined bank order for that transform pass. Such an embodiment may also comprise a set of decision maker banks identified within the plurality of memory banks, one decision maker bank for each of the plurality of transform passes. The set of decision maker banks may be used to determine which of the plurality of transform passes was interrupted, in order that the update process may be subsequently reattempted beginning with the interrupted transform pass. The update package may comprise the set of decision maker banks, and the difference information may comprise a set of executable instructions for converting a first version of the at least a portion of the at least one of firmware and a plurality of software components, to a second version of the at least a portion of the at least one of firmware and a plurality of software components.

An embodiment of the present invention may comprise an update agent capable of computing a signature for a decision maker bank in the set of decision maker banks beginning with the decision maker bank for the first transform pass in the transform pass order, and comparing the computed signature to a corresponding predetermined signature for that transform pass, the predetermined signature contained in the update package, to determine whether a match exists. The method may also comprise repeating the computing and comparing for the next transform pass in the transform pass order, if a match exists; and identifying the current transform pass as a point of interruption, if a match does not exist. The update package may comprise a predetermined checksum for each memory bank in the subset of the plurality of memory banks for the interrupted transform pass. In addition, the update agent may be capable of initiating a recovery from the point of interruption in the transform pass order. The update agent may be capable of determining the first bank in the predetermined bank order for the interrupted transform pass for which a mismatch between a computed checksum and a predetermined checksum for a memory bank in the predetermined bank order for the interrupt transform pass occurs. The computed checksum and the predetermined checksum may comprise a cyclic redundancy check (CRC) value, and the computed checksum and the predetermined checksum may comprise a MD5 hash value.

Yet additional aspects of the present invention may be seen in a method for recovering from interruption of a fault-tolerant process of updating a mobile handset comprising a plurality of memory banks from a first firmware version to a second firmware version. In such a method, the update process may comprise a plurality of transform passes and having a transform pass order, each of the plurality of transform passes performing a transform upon the plurality of memory banks in a memory bank order. In an embodiment of the present invention, the method may comprise determining as a recovery transform pass, one of the plurality of transform passes interrupted during the update process, and determining as a recovery memory bank, one of the plurality of memory banks in the memory bank order for the interrupted transform pass during which update processing was interrupted. The method may also comprise invoking the update process by performing an update of the recovery memory bank using the recovery transform pass. Determining a recovery transform may comprise employing one of the plurality of memory banks as a decision maker bank for each of the plurality of transform passes, and determining an interrupted transform pass in the transform pass order. Each of the decision maker banks may identify the last bank of the memory bank order for the corresponding one of the plurality of transform passes to be updated, the decision maker banks retrievable from an update package. In addition, determining the interrupted transform pass in the transform pass order may be based upon the decision maker banks for the plurality of transform passes in the fault-tolerant update process.

In an embodiment of the present invention, determining an interrupted transform pass may comprise computing a checksum of a decision maker bank beginning with the first transform pass in transform pass order, and comparing the computed checksum to a predetermined checksum retrieved from the update package to determine whether the computed checksum matches the predetermined checksum. The method also comprises repeating the computing and comparing for the decision maker bank of each of the subsequent transform passes in the transform pass order, if the computed and the predetermined checksums for a decision maker bank match, and identifying as interrupted, a transform pass for which the computed and predetermined checksums for a decision maker bank do not match. The computed checksum may comprise one of a cyclic redundancy check (CRC) value and an MD5 hash value, and the update package may comprise a set of executable instructions for converting a first firmware version to a second firmware version. The method may be employed during both an initial update attempt and during recovery from an interrupted update attempt.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF SEVERAL VIEWS OF THE DRAWINGS

The numerous objects and advantages of the present invention may be better understood by those skilled in the art by reference to the accompanying figures in which.

DETAILED DESCRIPTION OF THE INVENTION

Figure 1:
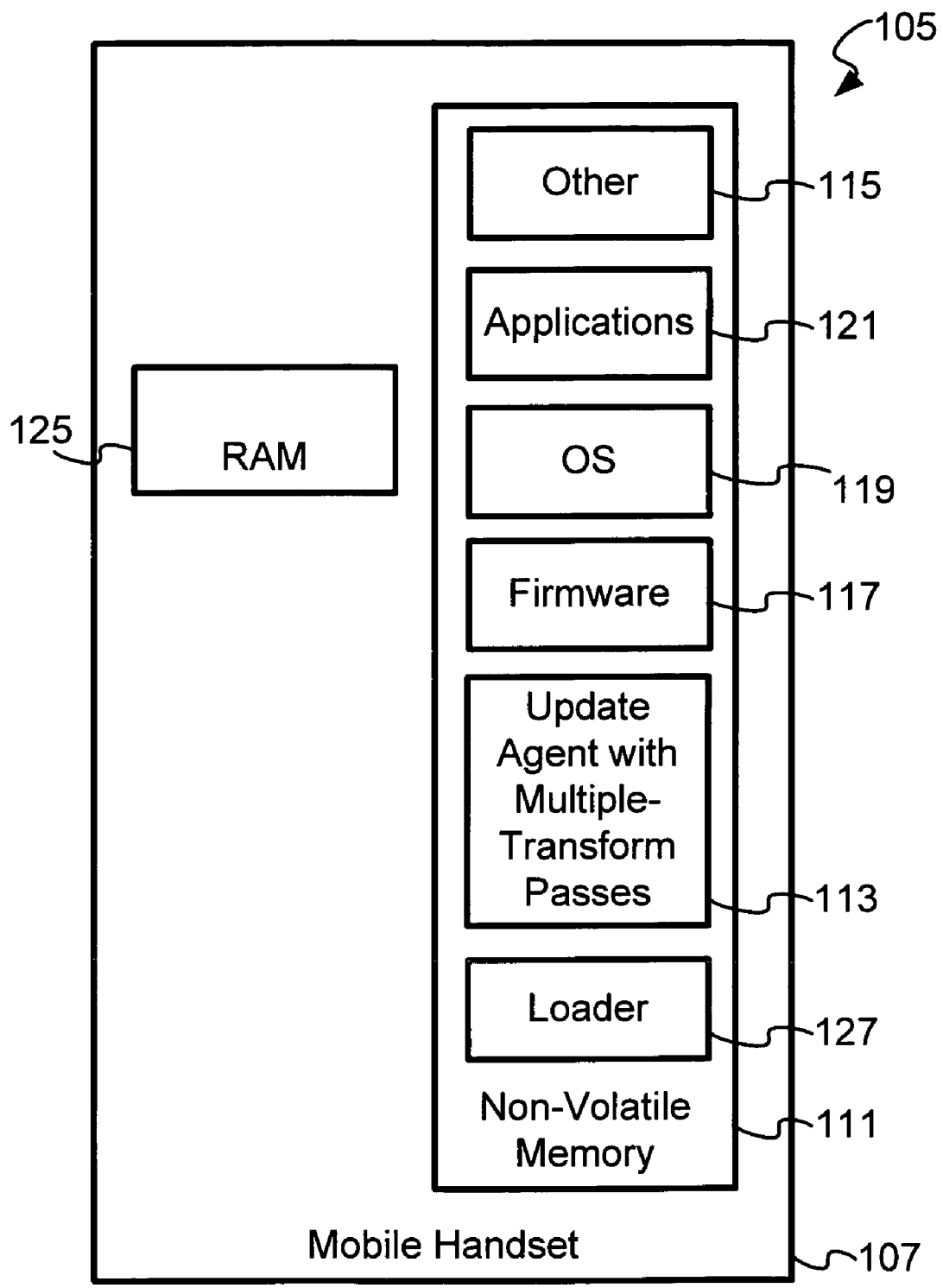
FIG. 1 is a perspective diagram of a mobile handset that employs an update agent in the mobile handset to update applications software, other software components, an operating system (OS), or firmware in the mobile handset, employing multiple-transforms over one or more passes, in accordance with an embodiment of the present invention.

FIG. 1 is a perspective diagram of a mobile handset 107 that employs an update agent 113 in the mobile handset 107 to update applications software 121, other software components 115, an operating system (OS) 119, or firmware 117 in the mobile handset 107, employing multiple-transforms over one or more passes, in accordance with an embodiment of the present invention. An update agent 113 may be resident in a non-volatile memory 111 of the mobile handset 107 and may be capable of employing multiple-transforms over one or more passes to update the firmware 117, the OS 119 and/or applications software 121 and other software components 115. The mobile handset 107 of FIG. 1 comprises a RAM 125 and a non-volatile memory 111. The non-volatile memory 111 in turn comprising a plurality of components, such as a loader 127, the update agent 113 that employs multiple transform passes, the firmware 117, the OS 119, applications software 121, and other software components 115. Although the following discussion makes reference to a mobile handset, an embodiment of the present invention is equally applicable in other electronic devices such as, for example, personal digital assistants (PDAs), personal computers (PCs), pagers, and the like.

In an embodiment of the present invention, the memory image of firmware 117 and/or software OS 119, applications software 121, and other software components 115 in the mobile handset 107 may be considered to comprise a plurality of memory banks, each memory bank serving as a unit of content that may be updated in a fault-tolerant manner by the update agent 113. In one embodiment of the present invention, the entire memory image of the non-volatile memory 111 of the mobile handset 107 may be updated, employing an update package that is received from an external source, such as a delivery server. The update package may comprise a set of executable instructions for converting a first version of software/firmware into a second or updated version of software/firmware.

In an embodiment in accordance with the present invention, the mobile handset 107 may, on power-up, execute the loader 127. The loader 127 may invoke a boot initialization code before determining the need to update the mobile handset 107, and to subsequently access the update agent 113 in the mobile handset 107.

The update agent 113 in an embodiment of the present invention may employ multiple transforms to update software/firmware within the mobile handset 107, wherein each transform may take one pass, or a portion of a pass. For example, a first pass may be a pre-processing pass that is employed to modify addresses and references in the old memory image, to make it resemble a new memory image or portions thereof. A second pass may include executing instructions such as, for example, ADD, COPY, DELETE, SET, SETR, etc. in order to update one or more banks of the memory image of a firmware or other software such as, for example, the firmware 117, applications software 121, or other software components 115.

An embodiment of the present invention may use a decision maker bank to determine which transform was interrupted, so that the interrupted transform can be reattempted. Specifically, the decision maker bank may be specified by a generator of an update package, and may serve as a milestone that indicates the last bank to be updated during a pass which implements a transform. During a recovery process, the cyclic redundancy check (CRC) of the decision maker bank may be computed and compared to a predetermined CRC value for the decision maker bank as specified in the update package by the generator of the update package. If the computed CRC is the same as the predetermined CRC specified in the update package, it may be assumed that the associated transform was successfully completed before an interruption of the update process occurred. In this case, a recovery process may focus on recovering from an interruption of a subsequent transform pass. If, however, it is determined that the computed CRC for the decision maker bank is not the same as the predetermined CRC value specified by the generator of the update package, then it may be assumed that the associated transform was not successfully completed. In such a case, a recovery process may be used to recover from the interrupt transform pass. This may start with the determination of the first bank in a predetermined bank order for that pass for which a mismatch between an expected post-transform CRC value and a computed CRC value occurs. Although the use of a CRC is described, other forms of digital signature or check value may be employed without departing from the spirit of the present invention.

In an embodiment of the present invention, the mobile handset 107 may detect the need to update firmware/software when it powers up (or is rebooted) and determines that a previous attempt to update the firmware/software had been interrupted. The mobile handset 107 may then determine the transform that was being applied when an interruption to the update occurred. To do this, it may compare a post-transform CRC (or other signature) of a decision maker bank, as specified in the update package, to that of a locally computed CRC value for the same bank. If the mobile handset 107 determines that these two CRC values (or an alternative signature) match, the mobile handset 107 may assume that the associated transform had been successfully completed before an interruption such as, for example, a power failure, occurred. Thus, the next transform may be deemed to be the one that was interrupted. To confirm this, a decision maker bank associated with the next transform may be accessed, and a CRC value for the decision maker bank may be computed and compared to the CRC value specified for the decision maker bank in the update package. Again, a mismatch indicates that the associated transform (the next transform in this case) had been interrupted. If a match occurred, the next decision maker bank associated with the next transform pass may be checked, until all decision maker banks are found to match the predetermined value for the decision maker bank in question, or until a mismatch is found. Each transform would have an associated decision maker bank that would help determine the successful completion of that transform, each transform can be executed within one pass, requiring less than one complete pass, or employing more than one pass.

The update agent in an embodiment of the present invention may update firmware and/or software employing a plurality of transforms, each transform employing one pass or a portion of one pass to execute, each pass associated with its own bank order and with its own decision maker bank (for recovery following a fault, such as power failure).

In another embodiment of the present invention, the update agent may update firmware and/or software employing a plurality of transforms, each transform employing one or more passes, or a subset of one pass, to execute, each pass associated with its own bank order and with its own decision maker bank (for recovery following a fault, such as power failure).

In yet another embodiment of the present invention, the update agent may update firmware and/or software employing a plurality of transforms, one or more transforms executed in each pass, each transform employing/associated with its own bank order and with its own decision maker bank (for recovery following a fault, such as power failure).

In an embodiment of the present invention, the last transform may also be associated with a decision maker bank that can be processed to determine if it has been successfully updated.

Figure 2:
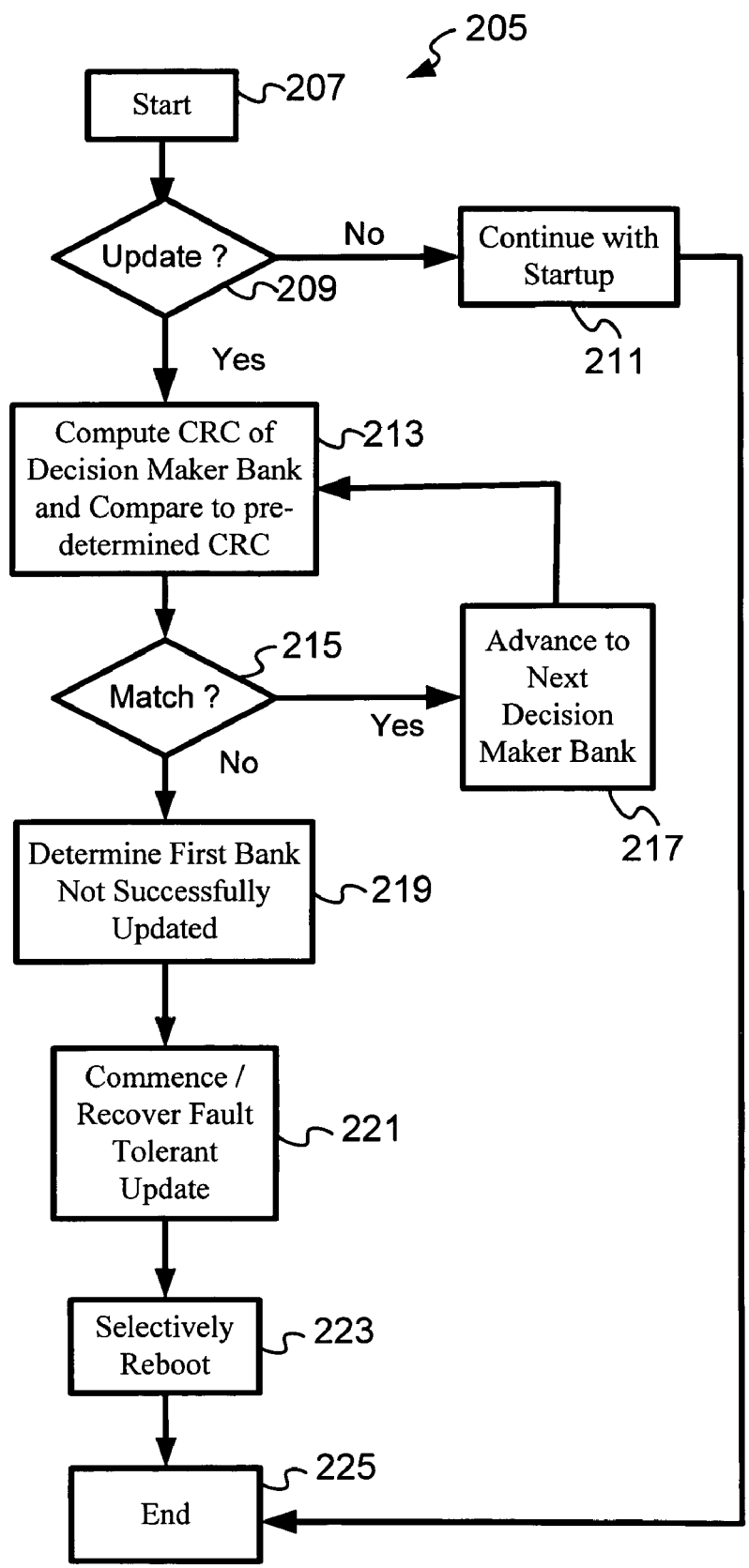
FIG. 2 is a flow chart describing an exemplary method of operation of a mobile handset such as, for example, the mobile handset wherein an update agent determines the transform that was interrupted in an attempt to recover update processing from where it was left off prior to an interruption or fault, in accordance with an embodiment of the present invention.

FIG. 2 is a flow chart describing an exemplary method of operation of a mobile handset such as, for example, the mobile handset 107 of FIG. 1, wherein an update agent determines the transform that was interrupted in an attempt to recover update processing from where it was left off prior to an interruption or fault, in accordance with an embodiment of the present invention. Although this discussion of FIG. 2 refers to a mobile handset, the method applies equally to other electronic device such as, for example, personal digital assistants (PDAs), personal computers (PCs), pagers, and the like. The example of FIG. 2 begins at a start block 207, where the processing starts when the mobile handset is powered up or restarted. At a next block 209, an attempt is made to determine if an update is available for processing. If it is determined that an update is not available, then, at a next block 211, the normal startup of the mobile handset is executed.

If, at the block 209, it is determined that an update is available, then, at a next block 213, the update agent computes the CRC of the decision maker bank for the current transform, such as a pre-processing transform, to be compared to the pre-computed CRC of the decision maker bank (that can be considered as the post-transform CRC value for that bank). Such a pre-computed CRC of the decision maker bank may be provided by the generator of the update package being processed.

Then, at a next decision block 215, the computed CRC (or an alternative signature) is compared to the pre-determined CRC (or an alternative signature) provided in the update package. If it is determined that the two CRC values (or signatures) match, then, at a next block 217, the decision maker bank for the next transform (or next pass) is determined and accessed, so that a CRC value can be computed for the decision maker bank, before control is transferred back to the next block 213.

If, at the decision block 215, it is determined that the computed and predetermined CRC values (or signatures) do not match, then, at a next block 219, the first bank that is not successfully updated is determined. This determination may take the current transform or pass and the associated bank order into consideration. Such a bank would serve as a point of recovery in the case of an interrupted update. In the case of a first time update attempt, the first bank in the bank order of the first pass for the first transform would be selected.

Then, at a next block 221, the fault tolerant update processing would commence for a first time update attempt. For the case where a recovery from a previously interrupted update attempt is being executed, a fault tolerant recovery is attempted.

Next, at block 223, at the successful completion of the update process, the mobile handset is selectively rebooted.

Finally, at an end block 225, the processing of the update package for updating firmware and/or software is terminated.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

What is claimed is:

1. A mobile handset comprising:
    at least one memory device that stores at least one of a firmware component and a software component;
    an update agent capable of updating the at least one of a firmware component and a software component employing an update process that comprises a plurality of transform passes, wherein each transform pass is associated with its own memory bank order, and wherein each transform pass updates a plurality of memory banks in the associated memory bank order for that transform pass; and
    the update agent executing at least one of the plurality of transform passes in a fault-tolerant mode.

2. The mobile handset according to claim 1 wherein the update agent executes each of the plurality of transform passes in a fault-tolerant mode.

3. The mobile handset according to claim 1 wherein the update process comprises a pre-processing pass and an update pass.

4. The mobile handset according to claim 1 wherein the update agent is capable of determining a point of interruption of the update process, so as to restart the update process from the point of interruption on a subsequent invocation of the update process.

5. The mobile handset according to claim 4 wherein the update agent is capable of determining whether a previous invocation of the update process was interrupted during a pre-processing pass or during an update pass.

6. The mobile handset according to claim 1 wherein the update agent is capable of determining which of the plurality of transform passes was interrupted during a previous execution of the update process.

7. The mobile handset according to claim 1 wherein the mobile handset comprises:
    a plurality of memory banks;
    a set of special signatures comprising at least one special signature corresponding to each of the plurality of transform passes;
    the at least one special signature being associated with the last of the memory banks that is updated in the corresponding transform pass;
    at least a subset of the plurality of memory banks being modified in each of the plurality of transform passes; and
    the update agent capable of determining which of the plurality of transform passes was interrupted during a previous execution of the update process.

8. The mobile handset according to claim 7 wherein the update agent determines the transform pass that was interrupted during a previous execution of an update process, and the specific one of the plurality of memory banks that was last to be successfully updated, in order to resume the update process.

9. The mobile handset according to claim 8 wherein the update agent compares, in a transform pass order, each special signature from the set of special signatures to a signature computed for the last bank to be updated in the corresponding transform pass, until a mismatch is detected, the mismatch indicating a point of interruption during a previous update attempt.

10. The mobile handset of claim 7 wherein the special signature comprises one of a cyclic redundancy check (CRC) value and an MD5 hash value.

11. A mobile handset comprising a plurality of memory banks containing at least one of a firmware and a plurality of software components, the mobile handset comprising:
    an update package comprising a difference information;
    an update agent capable of updating at least a portion of the at least one of firmware and a plurality of software components, the update agent employing an update process that comprises a plurality of transform passes, wherein each of the plurality of transform passes is associated with its own memory bank order, and wherein each transform pass updates the plurality of memory banks in the associated memory bank order for that transform pass; and
    a set of decision maker banks identified within the plurality of memory banks, one decision maker bank for each of the plurality of transform passes, the set of decision maker banks used to determine which of the plurality of transform passes was interrupted, in order that the update process may be subsequently reattempted beginning with the interrupted transform pass.

12. The mobile handset of claim 11 wherein the update package comprises information identifying the set of decision maker banks.

13. The mobile handset of claim 11 wherein the difference information comprises a set of executable instructions for converting a first version of the at least a portion of the at least one of firmware and a plurality of software components, to a second version of the at least a portion of the at least one of firmware and a plurality of software components.

14. The mobile handset of claim 11 wherein the update agent is capable of:
  i) computing a signature for a decision maker bank in the set of decision maker banks, beginning with the decision maker bank for the first transform pass in the transform pass order;
  ii) comparing the computed signature to a corresponding predetermined signature for that transform pass, the predetermined signature contained in the update package, to determine whether a match exists;
  iii) repeating (i) and (ii) for the next transform pass in the transform pass order, if a match exists; and
  iv) identifying the current transform pass as a point of interruption, if a match does not exist.

15. The mobile handset of claim 14 wherein:
  the update package comprises a predetermined checksum for each memory bank in the subset of the plurality of memory banks for the interrupted transform pass.

16. The mobile handset of claim 14 wherein the update agent is capable of:
  initiating a recovery from the point of interruption in the transform pass order; and
  determining the first bank in the associated memory bank order for the interrupted transform pass for which a mismatch between a computed checksum and a predetermined checksum for a memory bank in the associated memory bank order for the interrupt transform pass occurs.

17. The mobile handset of claim 16 wherein the computed checksum and the predetermined checksum comprise a cyclic redundancy check (CRC) value.

18. The mobile handset of claim 16 wherein the computed checksum and the predetermined checksum comprise a MD5 hash value.

19. A method for recovering from interruption of a fault-tolerant process of updating a mobile handset comprising a plurality of memory banks from a first firmware version to a second firmware version, the update process comprising a plurality of transform passes and having a transform pass order, each of the plurality of transform passes performing a transform upon the plurality of memory banks in a memory bank order, the method comprising:
  determining as a recovery transform pass, one of the plurality of transform passes interrupted during the update process, wherein each of the plurality of transform passes is associated with its own memory bank order, and wherein each transform pass updates a plurality of memory banks in the associated memory bank order for that transform pass;
  determining as a recovery memory bank, one of the plurality of memory banks in the associated memory bank order for the interrupted transform pass during which update processing was interrupted; and
  invoking the update process by performing an update of the recovery memory bank using the recovery transform pass.

20. The method according to claim 19 wherein determining a recovery transform comprises:
  employing one of the plurality of memory banks as a decision maker bank for each of the plurality of transform passes, each of the decision maker banks identifying the last bank of the memory bank order for the corresponding one of the plurality of transform passes to be updated, the decision maker banks retrievable from an update package; and
  determining an interrupted transform pass in the transform pass order, based upon the decision maker banks for the plurality of transform passes in the fault-tolerant update process.

21. The method according to claim 20 wherein determining an interrupted transform pass comprises:
  i) computing a checksum of a decision maker bank, beginning with the first transform pass in transform pass order;
  ii) comparing the computed checksum to a predetermined checksum retrieved from the update package to determine whether the computed checksum matches the predetermined checksum;
  iii) repeating (i) and (ii) for the decision maker bank of each of the subsequent transform passes in the transform pass order, if the computed and the predetermined checksums for a decision maker bank match; and
  iv) identifying as interrupted, a transform pass for which the computed and predetermined checksums for a decision maker bank do not match.

22. The method according to claim 21 wherein the computed checksum comprises one of a cyclic redundancy check (CRC) value and an MD5 hash value.

23. The method according to claim 20 wherein the update package comprises a set of executable instructions for converting a first firmware version to a second firmware version.

24. The method according to claim 19 wherein the method is employed during both an initial update attempt and during recovery from an interrupted update attempt.

* * * * *